Feb. 9, 1954 G. T. RANDOL Re. 23,780

AUTOMOTIVE VARIABLE-SPEED TRANSMISSION
AND CONTROL MECHANISM THEREFOR

Original Filed May 20, 1946 7 Sheets-Sheet 1

INVENTOR:
Glenn T. Randol,
BY P. N. Lamphere
ATTORNEY.

Feb. 9, 1954 G. T. RANDOL Re. 23,780

AUTOMOTIVE VARIABLE-SPEED TRANSMISSION
AND CONTROL MECHANISM THEREFOR

Original Filed May 20, 1946 7 Sheets-Sheet 2

INVENTOR:
Glenn T. Randol,
BY P. N. Lamphere
ATTORNEY.

Feb. 9, 1954 G. T. RANDOL Re. 23,780

AUTOMOTIVE VARIABLE-SPEED TRANSMISSION
AND CONTROL MECHANISM THEREFOR

Original Filed May 20, 1946 7 Sheets-Sheet 3

INVENTOR:
Glenn T. Randol,
P. N. Lamphere
ATTORNEY.

Feb. 9, 1954 G. T. RANDOL Re. 23,780

AUTOMOTIVE VARIABLE-SPEED TRANSMISSION
AND CONTROL MECHANISM THEREFOR

Original Filed May 20, 1946 7 Sheets-Sheet 4

INVENTOR:
Glenn T. Randol,
BY P. W. Lamphere
ATTORNEY.

Feb. 9, 1954

G. T. RANDOL

AUTOMOTIVE VARIABLE-SPEED TRANSMISSION AND CONTROL MECHANISM THEREFOR

Re. 23,780

Original Filed May 20, 1946

7 Sheets-Sheet 5

INVENTOR:
Glenn T. Randol,
BY P. N. Lamphere
ATTORNEY.

Feb. 9, 1954 G. T. RANDOL Re. 23,780

AUTOMOTIVE VARIABLE-SPEED TRANSMISSION AND CONTROL MECHANISM THEREFOR

Original Filed May 20, 1946 7 Sheets-Sheet 6

INVENTOR:
Glenn T. Randol,
BY P. N. Lamphere
ATTORNEY.

INVENTOR:
Glenn T. Randol,
BY P. N. Lamphere
ATTORNEY.

Reissued Feb. 9, 1954 Re. 23,780

UNITED STATES PATENT OFFICE 23,780

AUTOMOTIVE VARIABLE-SPEED TRANSMISSION AND CONTROL MECHANISM THEREFOR

Glenn T. Randol, Mountain Lake Park, Md.

Original No. 2,578,740, dated December 18, 1951, Serial No. 671,088, May 20, 1946. Application for reissue February 19, 1952, Serial No. 272,462

38 Claims. (Cl. 74—333)

Matter enclosed in heavy brackets [ ] appears in the original patent but forms no part of this reissue specification; matter printed in italics indicates the additions made by reissue.

This invention relates to automotive power transmissions, and more particularly to improvements in the transmission drive-mechanism such that all the speeds are of the positive-drive type for transmitting power from the engine to the driving wheels of motor vehicles.

One of the primary objects of the invention is to produce an improved variable-speed transmission and control means whereby a plurality of different forward speeds may be selectively established in a noiseless and effortless manner following movement of a manually-operated control member to a predetermined position.

*A further important object of the present invention is to produce in a change-speed transmission, three forward speed two-way drives responsive to a novel and improved personally-controlled drive element shiftable selectively to two positions of uninterrupted meshing relation with another drive element, one of said positions causing low speed drive to be effective and the other position conditions the transmission for forward drive in either intermediate or high speed and renders the low speed drive ineffective as a drive.*

*Another salient feature is the provision in two-way drive mechanism of a novel slidable gear meshable with another gear for establishing in part a certain drive condition, said slidable gear operably incorporating a one-way coupling and two independent positive coupling elements including a cooperating member slidable in parallel relation with said slidable gear in connected relation with one of said coupling elements for rendering the one-way coupling inoperative and completing the aforesaid drive condition, said slidable gear being slidable relatively to said cooperating member for disconnecting said one coupling element therefrom to render the one-way coupling operative and disable the aforesaid drive condition, and sequentially connecting the other coupling element to an independent cooperating member common to the other drive conditions for conditioning for operation said other drives with the two aforesaid gears in meshing relation.*

Another object is to produce an improved variable-speed drive transmission having a slidable lower speed ratio gear which, after being meshed with a companion gear to establish said lower speed ratio drive, need not be unmeshed during selective establishment of higher speed ratio drives.

A further object is to produce an improved variable-drive transmission which will accommodate a series of forward speed drives to be individually selected and established while a slidable gear of another speed drive is in meshed condition with a companion gear, which meshing condition is ineffective to interfere with the establishment of the said first-mentioned speed drives.

A still further object is to produce a novel change-speed transmission and control means therefor which will accommodate a low speed ratio drive to be established by moving a slidable gear into meshed relation with a companion gear, and a plurality of higher speed drives to be conditioned for selective establishment by an additional sliding movement of the slidable gear, but without demeshing it from the said companion gear.

Yet a further object is to associate with the sliding gear of the transmission above referred to, means for insuring that the lower of the higher speeds will be the first speed established after the sliding gear is given the said additional movement.

Yet another and more specific object of my invention is to produce a variable speed transmission which can be, as for example, controlled by motor power and/or manually actuated mechanisms, whereby the operator can obtain the lowest forward speed drive by a manual setting of a hand lever in a predetermined position, and then subsequently obtain, without demeshing the gearset comprising the lowest speed drive, alternate operativeness of two other higher speed drives by successive movements of an actuating member upon setting said hand lever in a different predetermined position, said transmission and control mechanism also being so constructed and arranged that the transmission can be neutralized at will by return of said hand lever from either of the aforementioned positions to an inoperative position thereof; whereupon, the control mechanism will be automatically conditioned so that upon a subsequent resetting of *the* hand lever to its second-named operative position, and operation of the said actuating member, the lower of the two higher speed drives will be caused to be first operative.

Another object is to produce an improved variable-speed transmission with a control mechanism therefor which will enable the operator to condition for operation the gearing of one of two speeds by causing a lower speed independent of the said two speeds to be operative by moving a predetermined manual member from a position wherein the transmission is inoperative to another position.

A further object is to provide in an improved variable-speed transmission a single movable unit comprising a low speed drive slidable meshing gear and a one-way clutch means operably incorporated therein for accommodating the low speed meshing gears to remain meshed while other higher speeds are selectively operative.

A still further object is to provide in a variable speed transmission an improved slidable unit and associated parts which, by a sliding operation thereof, will effect the establishment of an inoperative condition of the gearing, and an operative condition of two-way drive reverse, low, and a range control of intermediate and high speeds.

Another object is to provide in a variable-speed transmission an improved sliding unit comprising a low speed drive gear having an over-running clutch means, and positive clutch means operatively associated therewith in such manner that sliding movement of said unit controls neutralization of the transmission and the establishment of positive two-way drives in reverse, low, second (intermediate) and high speeds with said second and high speeds being selectively establishable without demeshing the low speed ratio gear with which the gear of the unit is arranged to mesh to establish the low speed drive.

Other objects of the invention will become apparent from the following description taken in connection with the accompanying drawings showing a preferred embodiment.

Figures 4, 14:
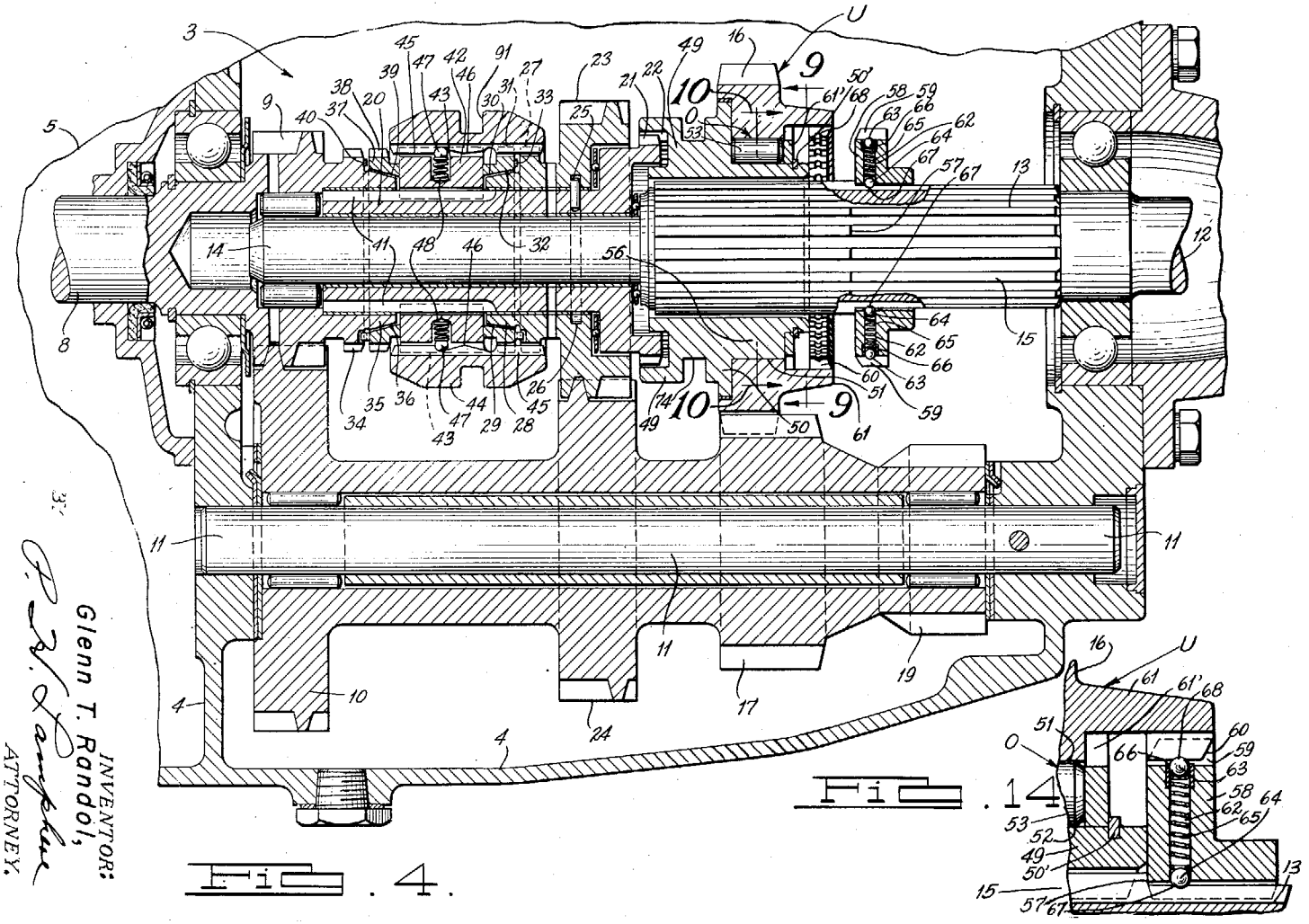
Figure 4 is another longitudinal sectional view through the transmission box, said view being taken on the line 4—4 of Figure 3.
Figure 6:
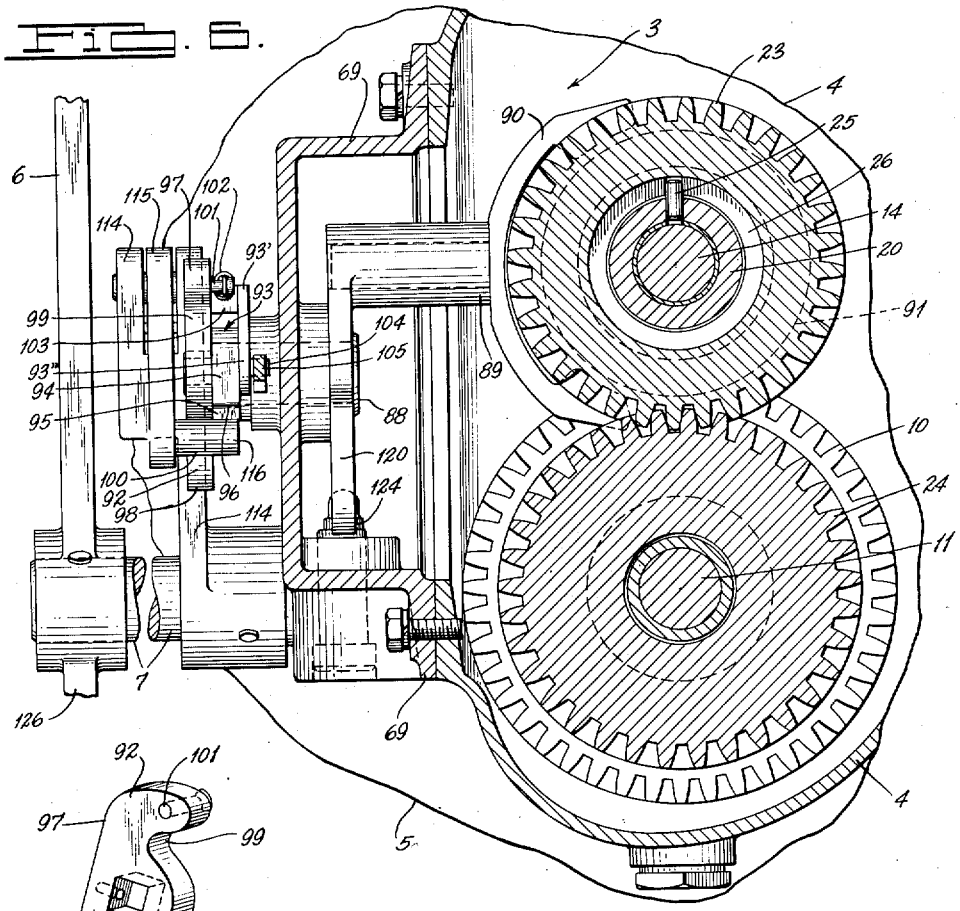
Figure 6 is a cross sectional view of the transmission taken on line 6—6 of Figure 2.
Figure 11:
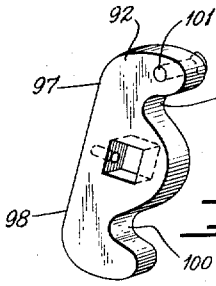
Figure 12:
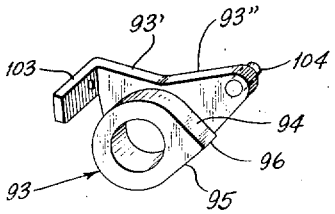
Figure 19:
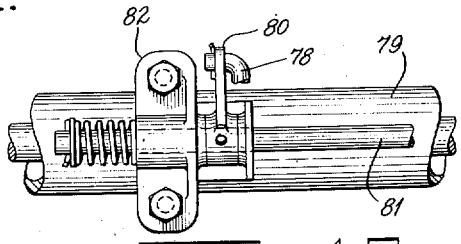
Figure 7:
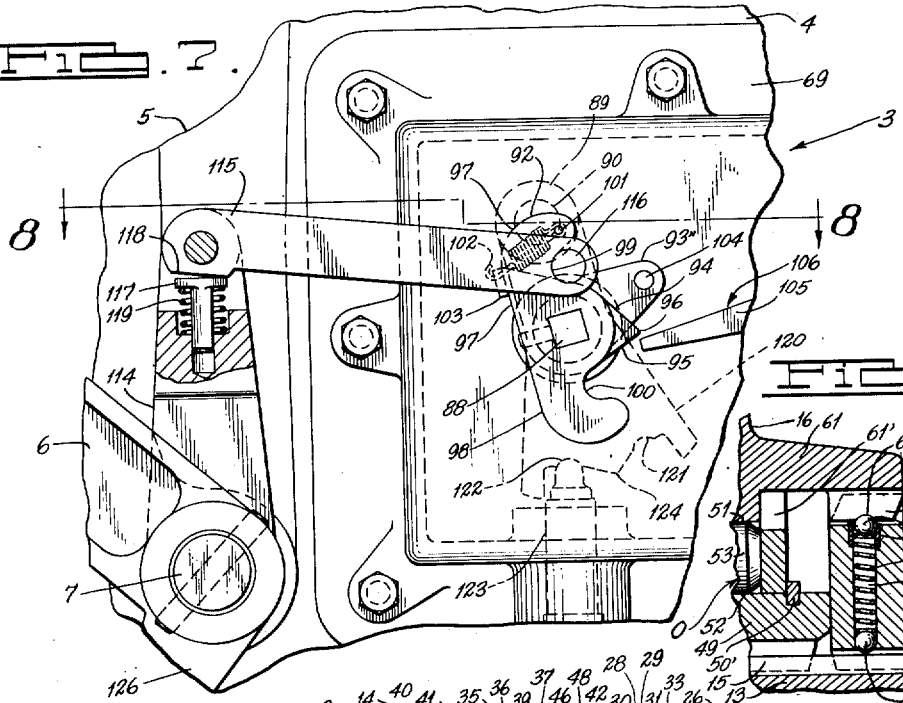
Figure 7 is a view of the cover plate side of the transmission box similar to the forward part of Figure 2, but showing the position the parts assume when high speed drive is established as the result of a depressing of the shift-actuator pedal.
Figure 16:
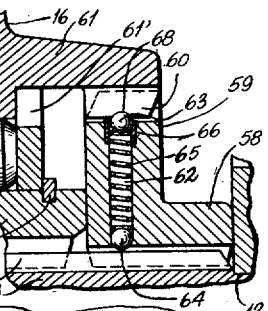
Figure 1:
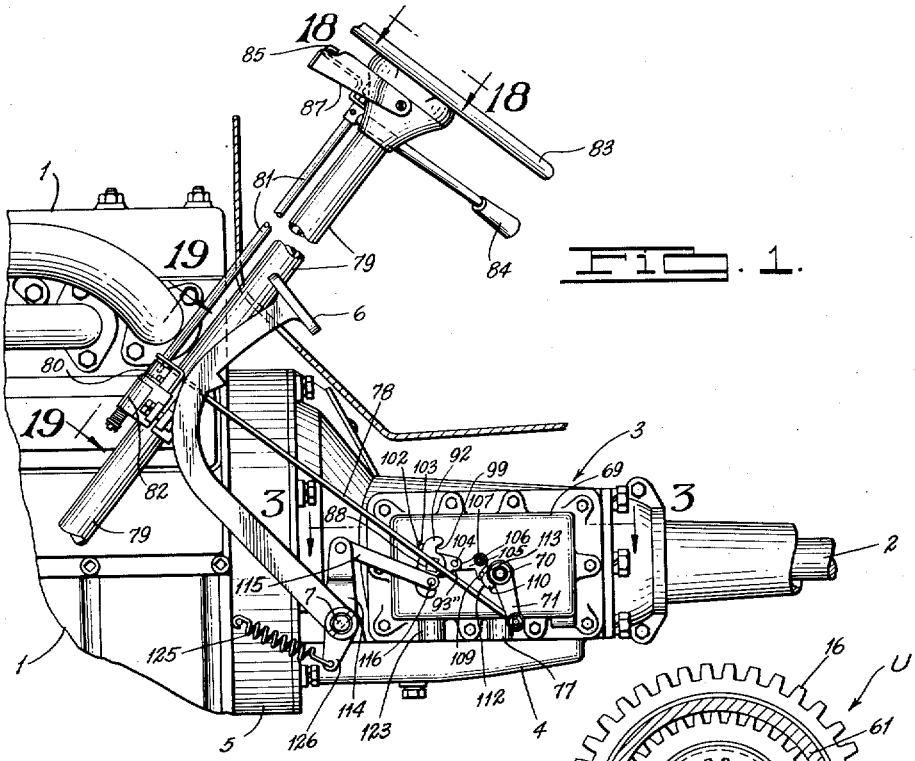
Figure 1 is a side view of a portion of a motor vehicle showing a variable-speed drive transmission and control means therefor which embody my invention, the parts shown being in positions assumed when the hand lever is in "Drive" range position with the clutch and shift actuator pedal [disengaged] *actuated*.
Figure 9:
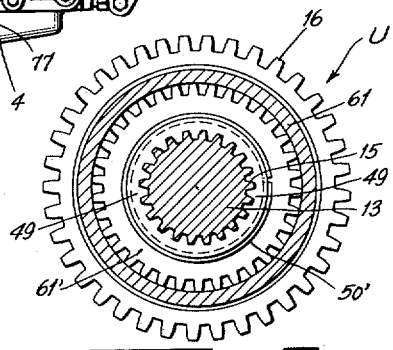
Figure 18:
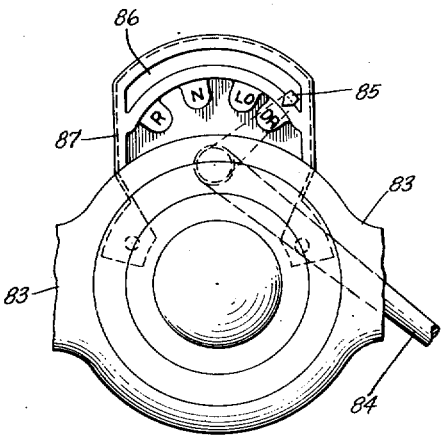
Figure 10:
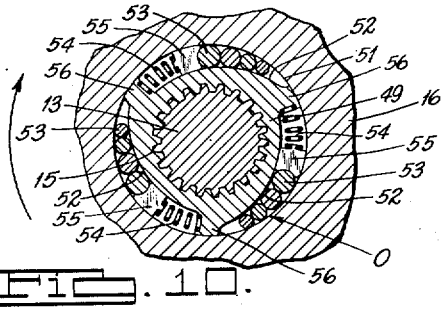
Figure 13:
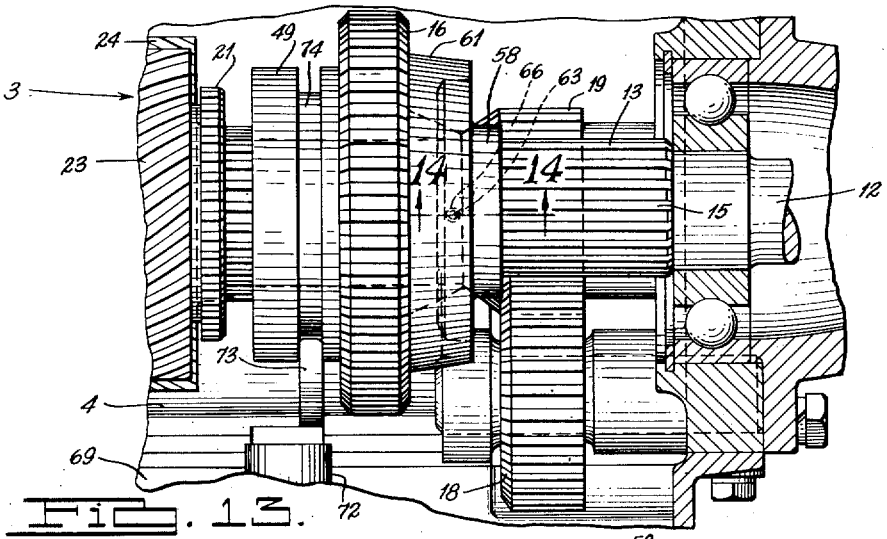
Figure 15:
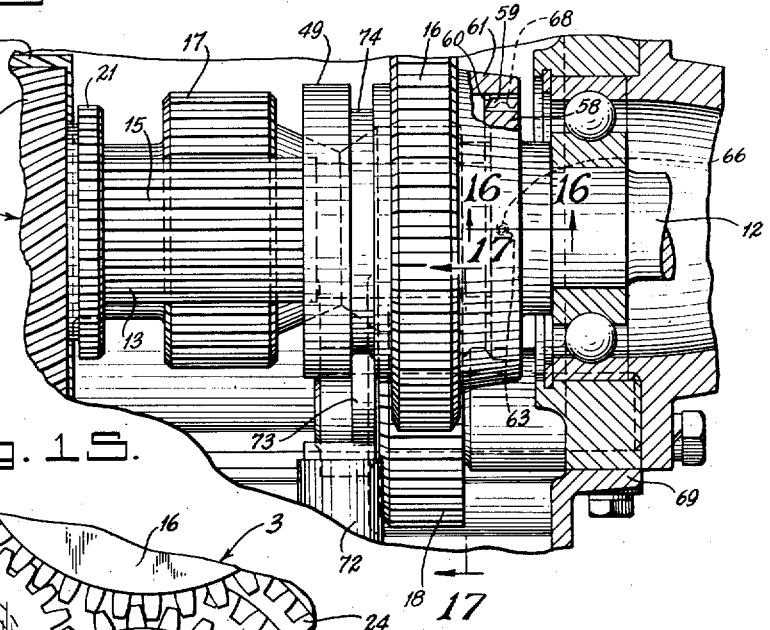
Figure 17:
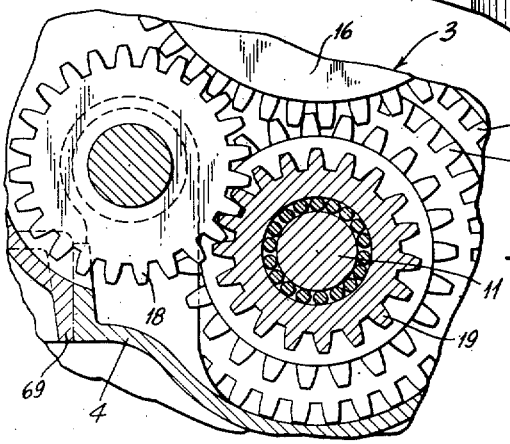

Figures 9 and 10 are cross sectional views through the sliding unit, said views being taken on the lines 9—9 and 10—10, respectively, of Figure 4;

Figure 11 is a perspective view of the double arm lever on the cover plate of the transmission box employable as part of the actuating means for alternately establishing intermediate and high speed drives;

Figure 12 is a perspective view of the V-shaped selecting cam associated with the double arm lever;

Figure 13 is a view of the rear portion of the gearing structure showing the sliding unit in the position assumed when low speed drive is established;

Figure 14 is a sectional view showing the locked-up condition of the gear of the sliding unit when the low speed drive is established as shown in Figure 13;

Figure 15 is a view of the rear portion of the gearing structure showing the sliding unit in the position assumed when reverse speed drive is established;

Figure 16 is a sectional view taken on the line 16—16 of Figure 15 showing the locked-up condition of the gear of the sliding unit when reverse speed drive is established as shown in Figure 15;

Figure 17 is a sectional view taken on the line 17—17 of Figure 15 showing the idler gear meshed by the gear of the sliding unit to establish reverse speed drive;

Figure 18 is a view of the gear-shifting lever and associated parts as viewed from line 18—18 of Figure 1; and Figure 19 is a view of the shift-control structure at the lower end of the shift-control shaft mounted on the steering column as viewed from line 19—19 of Figure 1.

Referring to Figure 1, the internal-combustion engine 1 of the motor vehicle is connected to the propeller shaft 2 by my novel variable-speed transmission 3 mounted in the housing or box 4, which is an improvement associated with and related to the change-speed gear transmission per se disclosed in my prior co-pending United States application, Serial No. 539,215, filed June 7, 1944, and entitled "Automotive Variable-Drive Power Transmission." Interposed between said engine and change-speed gearing is the usual fluid-coupling and/or friction clutch (not shown) which are contained in the engine flywheel housing 5. The actuator pedal 6 is secured to a clutch operating shaft 7 journaled in the forward end of the transmission housing and operably connected to actuate the clutch and certain drives of the transmission, for purposes of illustration, as will be hereinafter described in detail. The clutch and speed-changing control pedal 6 is illustrated as an example only, which will become apparent from the disclosure to anyone skilled in the art, since other "actuating means" for shifting between intermediate and high speeds may be employed; such as, for example, vacuum-power or fluid-pressure servomotor means, both of which come within the realm of reasonable equivalents in the patent sense.

Figures 3, 5:
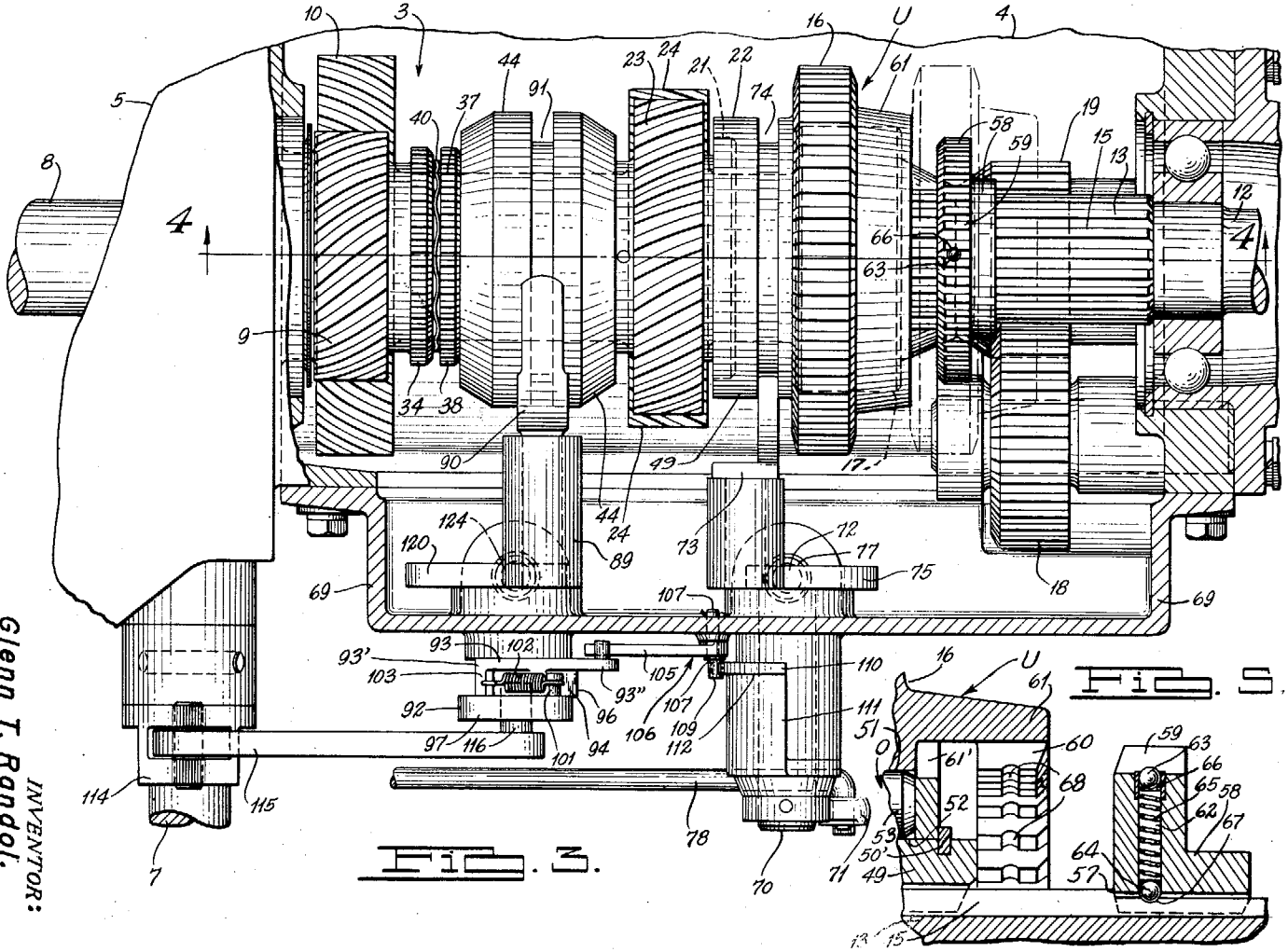
Figure 3 is a longitudinal sectional view through the transmission box showing the gearing and certain other parts therein, said view being taken on the line 3—3 of Figure 1.
Figure 5 is an enlarged sectional view showing the relationship of the sliding unit including the combined low and reverse gear and the lock-up clutch therefor as viewed in Figure 4 wherein the unit is moved to its "Drive" range position and the lock-up clutch is inoperative.

As best shown in Figures 3 and 4, the [drive] *driving* shaft 8 of the change-speed gearing is journaled in the forward end wall of the transmission housing 4 and has formed on its inner end a driving gear 9. This gear is in constant mesh with gear 10 of a cluster of countershaft gears rotatably mounted on fixed shaft 11 positioned in the housing 4 at the side of and parallel to the axis of the drive shaft. The driven shaft 12, which is connected to the propeller shaft 2 by the usual universal joint (not shown) is journaled in the rear end wall of the housing and has its forward end piloted in gear 9 of the [drive] *driving* shaft. This driven shaft has a rear splined portion 13 and a smooth reduced diameter portion 14 at its forward end. The rear splined portion 13 of the driven shaft has splines 15 and mounted thereon is a slidable unit generally indicated by the letter U, which will be later described in detail. This unit carries a combined low and reverse gear 16 which is capable, when the unit is in certain positions, of meshing with low gear 17 of the cluster of gears which is driven from the [drive] *driving* shaft through gear 10 previously referred to, and when in still another position it will mesh with an idler gear 18 which is constantly driven by a gear 19 on the rear end of the cluster of gears (see Figures 3 and 15) to establish reverse gear drive. When the unit is so positioned that the combined low and reverse gear 16 is intermediate the gear 17 and the idler gear 18 and out of mesh with both of said gears, it will be in its neutral condition and, as will later be described, the transmission as a whole will also be in an inoperative or neutral condition wherein power cannot be transmitted thereby.

The smooth forward end 14 of the driven shaft has rotatably mounted thereon a sleeve 20 and formed on the rear end thereof are clutch teeth 21. These clutch teeth are adapted to cooperate with clutch teeth 22 carried by the slidable unit U. When teeth 22 are engaged with teeth 21, as shown in Figures 3 and 4, sleeve 20 will be connected to the driven shaft through unit U *which conditions the transmission for forward drive in either intermediate or high speed.* When the clutch teeth 22 are disengaged, the driven shaft can rotate relatively to the sleeve.

Rotatably journaled on sleeve 20 is a second or intermediate speed gear 23 which is in constant mesh with a gear 24 of the aforementioned cluster of gears. The gear 23 is held from longitudinal movement with respect to the sleeve by a pin 25 carried by the sleeve and projecting into an annular groove 26 in the gear. The forward side of gear 23 carries clutch teeth 27 and extending beyond these teeth is an annular flange 28 having a conical surface 29. On this flange is mounted an annular synchronizing element 30 having teeth 31 and being provided with a conical surface 32 for cooperation with conical surface 29. The conical surfaces are normally biased away from each other by an annular wavy spring 33 interposed between the synchronizing element 30 and the portion of gear 23 carrying the clutch teeth 27.

The inner end of gear 9 on the [drive] *driving* shaft is also formed with clutch teeth 34 and extending beyond these teeth is an annular flange 35 having a conical surface 36. Mounted on this flange is an annular synchronizing element 37 having teeth 38 and being provided with a conical surface 39 for cooperation with conical surface 36. An annular wavy spring 40 normally biases the conical surfaces away from each other.

The external surface of sleeve 20 is provided with splines 41 and slidably and non-rotatably mounted thereon is an annular member 42 interposed between the two synchronizing elements 30 and 37, said elements normally abutting member 42 as the result of action of the springs 33 and 40. The outer surface of member 42 is provided with splines 43 and slidably *and non-rotatably* mounted thereon is a clutch element 44 having internal teeth 45 cooperating with splines 43 [41]. The central portions of some of teeth 45 are formed to provide converging surfaces 46 with which cooperates a ball 47 carried by member 42 and biased to engage the surfaces 46 by a spring 48.

The teeth 45 on the clutch element are of such length that they can be simultaneously in engagement with the teeth of both of the synchronizing elements. However, the teeth will only engage those of one of the synchronizing elements whenever the clutch element is moved to engage with the teeth on the gear with which the element is associated. Due to the spring-pressed ball 47 and the surfaces 46 on the clutch element, the clutch element will always be caused to be biased toward engagement with the teeth on one of the gears 23 or 9. Thus there is no *establishable* neutral position for the clutch element.

If it be assumed, as best shown in Figure 4, that clutch element 44 is in a position to connect the second speed gear with sleeve 20 and it is desired to shift the clutch element to connect the driving shaft 8 to sleeve 20, the movement of the clutch element to the left will, by means of the spring-pressed balls acting on the inclined surfaces, cause the synchronizing element 37 to become operative. This will tend to bring the speed of the clutch element 44 to the same speed as the driving shaft 8. Continued movement of the clutch element 44 to the left will then result in teeth 45 engaging with teeth 34 to establish the driving connection between sleeve 20 and the driving shaft. The teeth 45 will be disengaged from teeth 27 of the second speed gear just prior to engagement of teeth 45 with teeth 34. Due to the arrangement of inclined surfaces 46, the synchronizing action will cease at the time teeth 45 engage teeth 34. When the clutch element 44 is returned to engagement with teeth 27 of gear 23 the synchronizing element 30 will be caused to be operative in the same way as synchronizing element 37.

Figure 8:
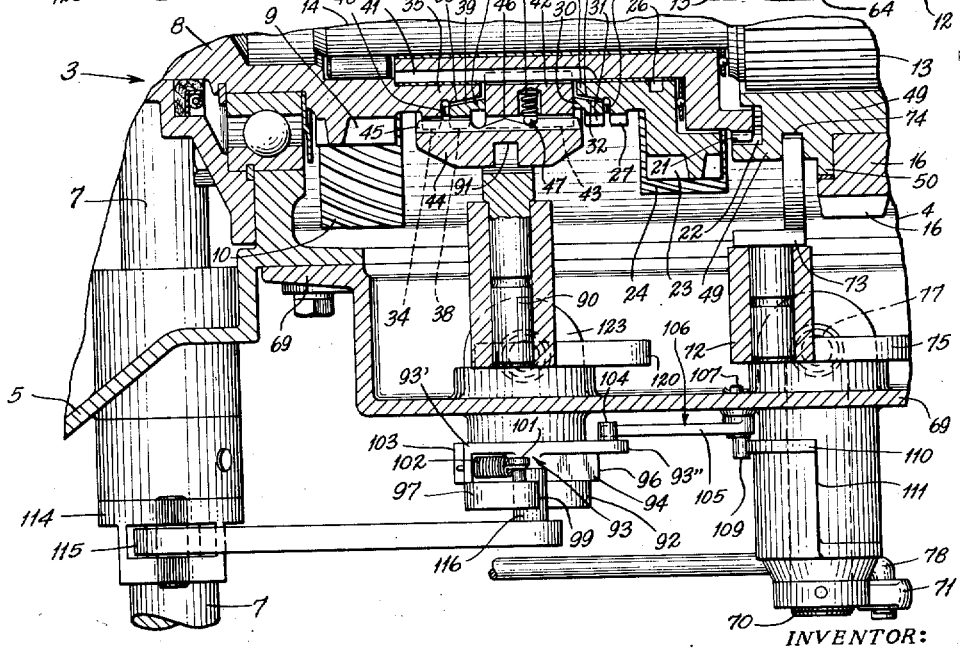
Figure 8 is a sectional view taken on the line 8—8 of Figure 7 and showing the position of certain parts in the transmission box when high speed drive is established.

Still referring particularly to Figure 4, the slidable unit U comprises a member 49 which is arranged to slide on the splines 15 of the rear portion 13 of the driven shaft. The forward end of this member 49 carries the internal teeth 22 previously referred to, whereby the sleeve 20 can be connected to the driven shaft when said teeth are in engagement with the teeth 21 as shown in Figure 4. The rear end of the member 49 is flanged, as indicated at 50, and this flanged portion carries the previously referred to combined low and reverse gear 16. Between the gear 16 and the flanged portion 50 is provided a one-way clutch *or coupling,* generally indicated by the letter O and best shown in Figures 4 and 10. This one-way clutch is of well known construction and comprises a cylindrical internal surface 51 of the gear bore, a plurality of eccentrically curved surfaces 52 on the flange, and interposed sets of *graduated* rollers 53. Each curved surface 52 is is so arranged with respect to the cylindrical surface 51 of the gear that a wedge shaped chamber is provided into which each set of rollers 53 can be wedged. It is to be noted that these rollers are of different sizes so that all of the rollers in each set can be effective simultaneously to provide a wedging action. A spring 54 acting through a block 55 forces each set of rollers towards a gripping condition. Each spring 54 abuts at the end opposite the block against a backing portion 56 formed on the flange, and these portions 56 also serve as bearing means upon which the gear 16 rotates. With this one-way clutch arrangement it is seen that if the gear 16 is rotated in the direction of the arrow of Figure 10, which will be the direction of rotation in which it is driven by the gear 17, then torque will be transmitted to the member 49 and through it to the driven shaft. This would be the condition present when the vehicle is being driven in low speed drive. It is also apparent that if the driven shaft 12, and of course the member 49 which is splined thereto, should be driven in the direction of the arrow in Figure 10, but at a greater speed than the gear 16 is being driven by the gear 17 of the cluster of gears, then there will be no driving connection present between the driven shaft and gear 16 as the one-way clutch accommodates an over-running condition. Such a condition would exist when the driven shaft is being driven through the sleeve 20, either by having the clutch element 44 connected to the gearing 23 (second speed drive) as shown in Figure 4, or the clutch 44 connected to the driving shaft (high speed direct drive ratio) as shown in Figure 8. It is apparent, therefore, that the one-way clutch provides for the gear 16 to remain in mesh, but in non-driving relation, with the gear 17 when either second or high speed drive is operative if power is being transmitted through the gears or clutches of such drives.

As the member 49 of the slidable unit U is moved rearwardly to the position shown in Figure 13 wherein the teeth 22 are disconnected from the teeth 21 of the sleeve 20, power may be momentarily transmitted to the driven shaft through the gears 17 and 16 by the one-way clutch O prior to the one-way drive action of said clutch being effectively disabled. Under such conditions, however, the one-way clutch would accommodate what is commonly termed "free-wheeling" by its over-running action in the event the driven shaft tends to rotate faster than the gear 16, a condition which would be present, for example, in a "coasting-drive" to the engine from the vehicle wheels. Such a "free-wheeling" action may be undesirable and, therefore, novel provision is made to insure that the one-way clutch will be inoperative or "locked-out" during the establishment of low speed drive effective to drive the vehicle so that there will be positive two-way vehicular drive under all conditions between gear 16 and the driven shaft. I propose to accomplish this desirable feature by a novel lock-out arrangement for the one-way clutch O which will be effective, not only when the sliding unit U is positioned to establish low speed, but also will be effective when the slidable unit U is moved to neutral or to a position wherein the gear 16 is in mesh with the idler gear 18 and reverse speed drive is established.

The rear portion of the splines 15 of the driven shaft is arranged to be of slightly less height than the forward portion of the splines to thus establish shoulders 57, probably best shown in Figure 5 which is an enlarged view of the structure to be described. Mounted for sliding movement on these rear portions of the splines 15 is a clutch *or coupling* element 58 having teeth 59 arranged to engage with internal teeth 60 carried by a rearward flanged portion 61 of the gear 16. The teeth 59 and 60 are chamfered, as shown, in order to facilitate their engagement. The clutch element 58 is formed with a plurality of radial bores 62 which may be of any number and each is arranged to open between two of the teeth 59. Within these bores are arranged double detents comprising a ball 63 at the outer end of the bore, a ball 64 at the inner end of the bore and an interposed spring 65 capable of acting on both balls to bias them in opposite directions. A retaining sleeve 66 at the outer end of the bore is arranged to act as a stop means to limit the outward displacement of the ball 63. Each inner ball 64 of a double detent means is arranged to cooperate with a recess 67 in the confronting top of the spline 15, which recess is so positioned that the clutch element 58 will be in engagement with the shoulders 57 when the ball is received therein. Each outer ball 63 of the detent means is arranged to engage in any one of a plurality of recesses 68 which are arranged in the top edge of the internal teeth 60 carried by gear 16. The balls 63 can only engage in these recesses when the teeth 59 and 60 are in full engagement. Thus the balls 63 will be capable of yieldably holding the teeth in full engagement and also yieldably holding the entire clutch element attached to the gear 16 of the unit U so that it all can move in unison as a single assembly whenever the unit is moved forwardly from either the neutral or reverse speed positions. The gear 16 and rollers 53 are held in position on the flange 50 of member 49 by a retainer 61′ and snap ring 59′. The retainer has a toothed outer portion to facilitate assembly through teeth 60. The toothed portion also acts as a bearing for gear 16.

The recesses 67, with which the balls 64 cooperate, are of such depth that they can receive a ball to a depth of about 40 percent of its diameter, whereas each recess 68 is of such depth as to receive a ball 63 to a depth of about 25 percent of its diameter. Thus the yieldable holding action of the clutch element 58 on the splines, when the element is at the shoulders 57, will be of considerable value and it is possible to engage the teeth 60 with the teeth 59 by moving the unit U to the right from the position shown in Figures 4 and 5 and without any possibility of moving the clutch element 58 away from shoulders 57.

Whenever the teeth 59 of the clutch element 58 are in engagement with the teeth 60 of the gear 16, it is seen that the gear 16 must always rotate with the driven shaft and the one-way clutch will thus be positively locked out. The shoulders 57 on the splines 15 are so arranged that when the clutch element 58 is in engagement therewith and the teeth of the clutch element 58 are in full engagement with the teeth on gear 16, the teeth 22 on the member 49 of the unit U will be disengaged from the teeth 21 on the end of sleeve 20 and spaced from said teeth the distances necessary to fully engage teeth 59 and 60 after the chamfered edges are opposite each other. This will be the low speed position of the sliding unit U, such low speed condition being shown in Figures 13 and 14. If the sliding unit U should be moved from this low speed position forwardly to the position shown in Figures 4 and 5, then the teeth 60 of the gear 16 will be moved away from the teeth 59 on the clutch element 58 and become disengaged. Following this disengagement the teeth 22 on member 49 of the unit will engage teeth 21, thus directly connecting the sleeve 20 to the driven shaft. This will be what is to be termed the "Drive" position of the sliding unit and results in a condition wherein either second or high speeds may be established, depending upon the position of the clutch element 44 which selectively controls these speeds. It is to be noted that during the sliding movement of the unit U from the low speed position (Figures 13 and 14) to the "Drive" range position (Figures 4 and 5), that the teeth of the gear 16 remain in meshed condition with the teeth of the countershaft gear 17. In order that there will be a full meshing of the teeth of these two gears during both positions of the sliding unit U, the teeth 17 are made of greater axial length than the teeth 16, all as shown in Figure 4.

In the event that the sliding unit U is moved rearwardly from the low speed drive position shown in Figures 13 and 14 after picking up clutch element 58 which was prevented from initially moving therewith due to the resistance offered by the balls 64 to disengagement out of their cooperating recesses 67 *to effect full engagement of teeth 59—60*, the teeth 59 of the clutch element 58 will remain engaged with the teeth 60 on the gear 16 since, under such conditions, the sliding unit U will then push the clutch element 58 along the splines by member 49 abutting the side of the clutch element. By such action the balls 64 will be disengaged from their recesses 67 as the clutch element leaves the shoulders 57. When the gear 16 becomes disengaged from the gear 17, neutral condition will result, this being the neutral condition for [the entire] *all drives of the* transmission, as then no power can be transmitted therethrough. In the event the sliding unit U is continued to be moved rearwardly after the gear 16 becomes unmeshed from the gear 17, the gear 16 will mesh with the idler gear 18 and this will establish reverse speed drive, which condition is shown in Figures 15, 16 and 17. Power can be transmitted positively under all conditions when reverse speed drive is established as the gear 16 continues to be positively connected with the driven shaft, due to the engaged condition of the clutch element 58 by the internal teeth 60 of the gear 16. The one-way clutch, therefore, will not be operative during reverse speed drive.

When the sliding unit U is moved forwardly again to cause the reverse speed drive to become inoperative, the clutch element 58 will be insured of being carried with the unit U due to the balls 63 being engaged with the recesses 68. This is the primary function of these spring biased balls 63. The pressure engagement of these balls in the recesses 68 will be greater under these conditions than they are when the gearing is in low speed ratio, as indicated in Figure 14, because each spring 65 will be additionally compressed while the balls 64 are riding on top of the splines 15. The clutch element 58 will be carried with the unit through the neutral position of the unit U to the low speed drive position. If the unit should be further moved forwardly from the low speed drive to the driving range position wherein the sleeve 20 is connected to the driven shaft, then the clutch element 58 will be disengaged due to the fact that the shoulders 57 will prevent it from moving with the unit which relative disengaging movement of the unit U with respect to the clutch element 58 will cause teeth 60 to become disconnected from teeth 59.

One side of the transmission housing 4 is open and this opening is closed by a plate 69. Toward the rear end of this plate is a shaft 70, the exterior end of which has secured thereto an arm 71. Secured to the inner end of this shaft is an upwardly extending arm 72 which has journaled in its end a shifting fork 73 engaging a groove 74 in the member 49 of the sliding unit U. It is by means of this shifting fork that the sliding unit is shifted back and forth to any of its four different positions, viz., neutral and reverse, low and "Drive" range speed positions, the "Drive" position including both intermediate and high speed drives. In order that the shifting fork 73 may be held in its different *shifted* positions, arm 72 is provided with a flange 75 having therein recesses 76 for cooperation with a spring pressed plunger 77 carried by the closure plate. The recesses 76 are four in number to correspond to the four positions of the sliding unit.

The external arm 71, by which the sliding unit U is moved, is connected to a rod 78 which extends to a point adjacent the lower end of the steering column 79 where it is connected to an arm 80 (see Figure 19). This arm is secured to a shift control shaft 81 extending parallel to the steering column 79 and the lower end thereof is journaled in a bracket 82. The upper end of shaft 81 is arranged to have bearing at the upper portion of the steering column with which is associated the steering wheel 83 as best shown in Figure 1. To the upper end of the shaft 81 is secured a gear-shifting lever 84 through which manual control of the sliding unit U is effected. The upper end of the shaft also has secured to it a pointer 85, the outer end of which is adapted to move in a slot 86 of an indicator bracket 87 suitably secured to the upper end of the steering column. This bracket carries the indicia "R," "N," "LO" and DR" which indicate the reverse, neutral, low and "Drive" range conditions respectively of the transmission and [corresponds] *correspond* to the four positions of the sliding unit U. It is important to note here, that the sliding unit U may be power operated to its different positions under control of the aforementioned manual-shift lever 84 which the prior art profusely demonstrates.

When the gear-shifting lever 84 is at a position so that the pointer indicates "DR," as it does in Figure 18, when the sliding unit U will be positioned as shown in Figure 4 so that sleeve 20 will be connected to the driven shaft and either second or high speed drives can be obtained, depending upon the position of the sliding clutch element 44 for controlling the operativeness of these two speed drives. If the lever 84 is moved so that the pointer is at "LO," then the sliding unit U will be at the position indicated in Figure 13 and low speed drive only will be established. If the gear-shifting lever is positioned so that the pointer is at "N," then the transmission will be in neutral condition with the sliding unit U at the position midway between the positions shown in Figures 13 and 15. If the gear-shifting lever 84 is positioned so the pointer indicates "R," then the sliding unit will be at the position shown in Figure 15 and the gearing will be in reverse speed drive.

The control mechanism shown for obtaining second and high speed drives will now be described. In the forward end of the closure plate there is mounted a second shaft 88 (see Figures 2, 6, 7 and 8) which has secured to its inner end an arm 89 and pivoted in the upper end of this arm is a shifting fork 90 which extends into groove 91 of the double clutch element 44. The outer end of shaft 88 has secured thereto a double armed shift actuating lever 92 shown in perspective in Figure 11. Also, rotatably mounted on the outer end of shaft 88 and positioned *coaxially* between the double arm lever and the closure plate is a selecting member 93 shown in perspective in Figure 12. The hub of this selecting member is formed with a V-shaped selecting cam having two *converging* surfaces 94 and 95 which meet at the apex 96. The member also carries two arms 97 and 98. The double arm shifting lever 92 is formed with recesses 99 and 100 on opposite sides of the axis of shaft 88. The upper arm of lever 92 carries a pin 101 to which is connected one end of a spring 102, the other end being connected to a flange 103 of arm 93' of member 93 to thereby bias this member so that flange 103 is in engagement with the double arm lever 92 (see Figure 2). The arm 93'' of member 93 carries a pin 104 which is adapted to be engaged by the end of a long arm 105 of a bell-crank lever 106 pivoted to the cover plate adjacent shaft 70 by a pin 107. The short arm 108 of the bell-crank lever carries on its end a pin 109 for cooperation with the edge surface of a flange 110 on a member 111 secured to shaft 70. The edge surface of the flange has a uniform curved portion 112 and a recess 113.

When the shaft 70 and the unit U are at any of their positions other than the "Drive" range ("DR" on the indicating bracket), the pin 109 will be riding on the curved surface 112 of flange 110. Under such conditions the bell-crank lever 106 will be held so that its long arm 105 is in the position shown in dotted lines in Figure 2. The long arm of the bell-crank lever will thus engage pin 104 on the selecting member 93 and move said member in a counterclockwise direction with respect to the double arm lever 92 to the position shown in dotted lines in Figure 2. The movement of the selecting member 93 relative to the double arm lever 92 will be against the bias of the spring 102. If the shaft 70 should be positioned to place the sliding unit U in the "Drive" range position, as shown in Figure 4, then the pin 109 can drop into the recess 113 and thus free the selecting member 93 so that the spring 102 can bring it to the position where its flange 103 will engage the double arm lever 92. With such conditions the selecting member 93 will then always move in unison with the double arm lever and the apex 96 of the selecting member can function to select which recess, 99 or 100, will be engaged by the pin 116 on the link 115 when the pedal 6 (second and high speed shift actuating means) is depressed beyond clutch disengaging position.

The clutch shaft 7 has secured thereto an upstanding arm 114 and pivoted to the upper end thereof is a link 115 extending rearwardly to a point beyond the apex 96 of [a] *the selecting* member 93. Carried by this rear end of the link is a pin 116 for cooperation with recesses 99 and 100 of the double arm lever 92. Link 115 is biased to a predetermined position by plunger 117 which cooperates with a flat surface 118 on the link. The plunger 117 is backed by a spring 119.

In order that the shifting fork 90 may be yieldably held in its operative positions, arm 89 is provided with a flange 120 having recesses 121 and 122 with which cooperates a spring pressed detent 123 mounted in the closure plate. The recesses converge to form a V-shaped surface having an apex 124, this apex being positioned slightly off center *with respect to the recesses* as shown.

There is also shown in Figure 1 a spring 125 which is connected to arm 126 extending from the control pedal 6 in order to hold said pedal in its [normal] *normally released* clutch engaged position.

OPERATION

The operation of my novel variable-speed transmission and control means therefor will now be explained. The transmission will be in neutral condition so that power cannot be transmitted thereby when the gear shifting lever 84 is set in the "N" position. Under such conditions the sliding unit U will be so positioned on the splined rear portion of the driven shaft 12 that the combined low and reverse gear 16 will be out of mesh with the low speed countershaft gear 17 and the reverse idler gear 18. Regardless of the position of the double clutch element 44 for connecting the sleeve 20 to either the second speed gear 23 or the [drive] *driving* shaft 8, no power can be transmitted through the sleeve 20 since the sliding unit U is in a position wherein the teeth 22 of the unit are disconnected from the teeth 21. This neutral condition of the transmission will be present when the vehicle is parked.

Figure 2:
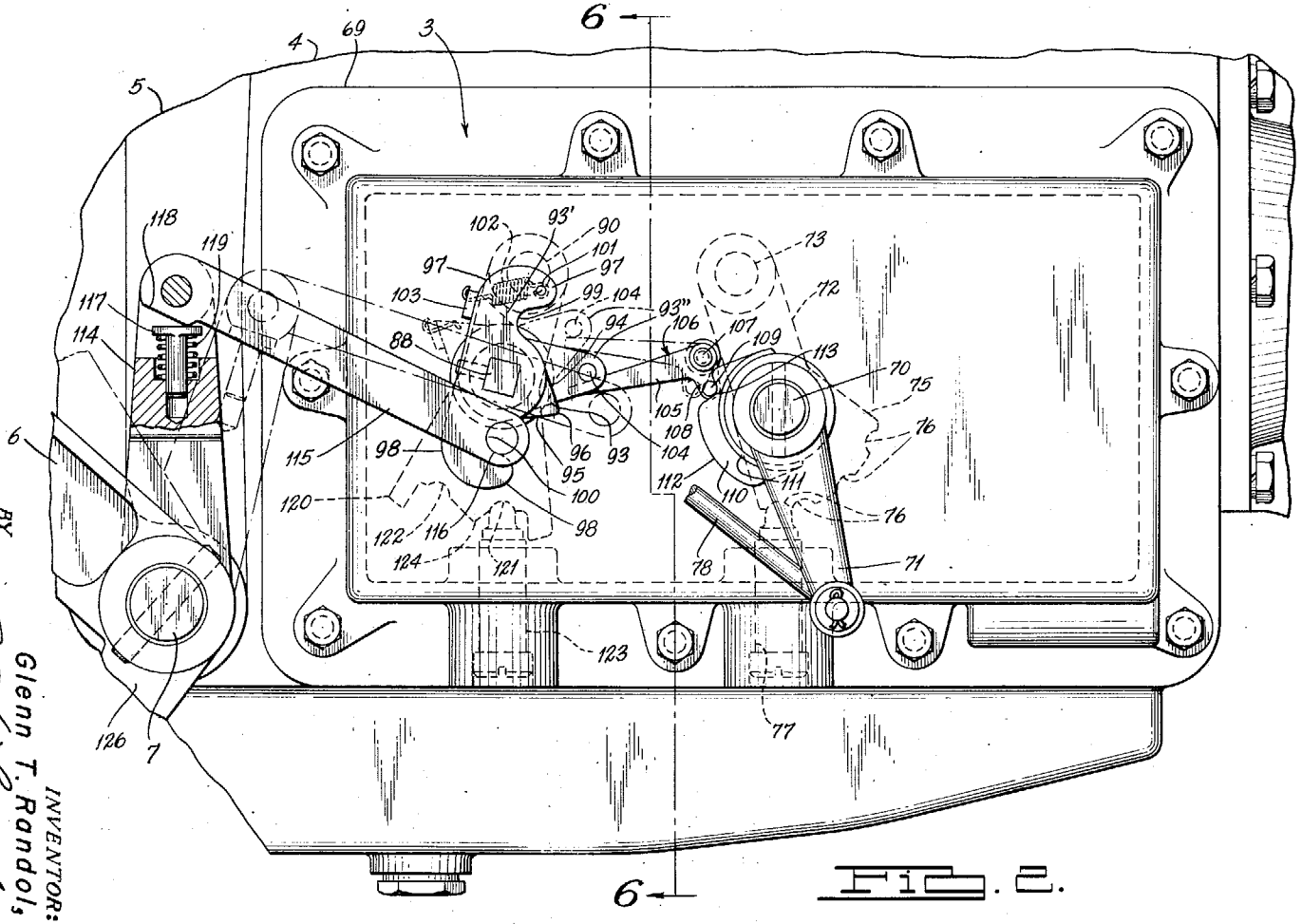
Figure 2 is an enlarged side view of the cover plate side of the transmission box with the parts being shown in the same position as in Figure 1 wherein second or intermediate speed drive has been established by depressing the control pedal.

If, at the time of parking, the double clutch element 44 should be in a position to connect the driving shaft directly with the sleeve 20, the double clutch element will be moved to a position [where] *wherein* the second speed gear 23 is connected to the sleeve 20, as shown in Figure 4, whenever the clutch pedal 6 is fully depressed beyond clutch disengaged position. It will remain in such position so that second speed will always be obtained first of the two higher speed drives whenever the gear-shifting lever is moved to the "DR" position. This second or intermediate speed drive condition is always brought about by the structure on the exterior of the cover plate. It is to be noted that when the gear-shifting lever is in other than the "DR" position, the bell-crank lever 106 will be in the dotted line position shown in Figure 2, and thus the apex 96 of the selecting V-shaped cam will be maintained in the position [where] *wherein* the pin 116 on the pedal-actuated link 115 will always move into the recess 100 of the double arm lever whenever the actuator pedal 6 is moved beyond *clutch* disengaged position. Thus it is seen that if the double clutch element 44 is in the high speed drive position shown in Figure 8, it will be moved to the second speed drive position shown in Figure 4 when the pedal 6 is fully depressed. Of course if the double clutch element 44 is already in the second speed drive position it will not be disturbed as the double arm actuating lever 92 is so positioned, as shown in Figure 2, that the pin 116 of link 115 will move into the recess 100 and back out of it as the control pedal 6 is depressed and released.

When it is desired to obtain low speed drive with the transmission neutralized, the pedal 6 will be depressed to disconnect the engine from the driving shaft of the transmission and then the gear-shifting lever 84 will be moved so that the pointer indicates "LO." This will result in the sliding unit U assuming the position shown in Figure 13 wherein the gear 16 will be moved into mesh with the countershaft gear 17. The clutch element 58 will be moved with the unit U and will become positioned against the shoulders 57 on the [spline] *splines* and will continue to have its teeth fully meshed with the internal teeth of the gear 16 so that there will be a positive connection between this gear and the driven shaft for a positive two-way low speed drive. The engaged condition of the clutch element 58 with the internal teeth of the gear 16 when low speed drive is operative is shown in Figure 14. The vehicle can then be driven in low speed drive when the clutch is [allowed to be] engaged by releasing the pedal 6.

If, now it is desired to employ the higher speed drives of the transmission, the pedal 6 will be depressed, either to just disengage the clutch or to a point beyond. Preferably, there should be a full depression of said pedal to insure that double clutch element 44 is placed in second speed drive position (Figure 4) if not already there. The gear-shifting lever will then be moved from the "LO" position to the indicated "DR" position. This movement of the gear-shifting lever will result in the sliding unit U being moved to the position shown in Figure 4. It will then be noted that the unit U, under such conditions, is moved away from the clutch element 58 so that the gear 16 is no longer positively connected with the driven shaft and the one-way clutch O [can] *conditioned to* be operative. It will also be noted that the sleeve 20 is now directly connected to the driven shaft by the engagement of the clutch teeth 21 and 22. The gear 16 will remain in mesh with the countershaft gear 17. The placing of the unit U in the position shown in Figure 4 will also result in the flange 118, movable with the shaft 70, being positioned so that the pin 109 carried by the short arm of the bell-crank lever 106 can drop into the recess 113. This will free the selecting member 93 and the spring 102 will be effective to move it to the position shown in full lines in Figure 2 so that the apex 96 will be positioned to guide the pin 116 into the recess 99 of the double arm lever 92 whenever the pedal 6 is subsequently released and again depressed. Upon release of the actuator pedal 6 the clutch will be engaged and power will be transmitted to the driving shaft. Since the double clutch element 44 is already connecting the second speed drive gear 23 with the sleeve 20, and the sleeve 20 is directly connected to the driven shaft, it is seen that power can be transmitted from the [drive] *driving* shaft through the countershaft and to the driven shaft at the second speed drive. Since the countershaft is always driven from the driving shaft, the combined low and reverse gear 16 will continue to be rotated since it remains in mesh with the countershaft gear 17. However, since the driven shaft will be driven at a greater speed than the gear 16 can be driven by the countershaft gear, the one-way clutch O will be effective to accommodate the gear 16 to "free-wheel" and there will be no interference caused thereby, even though it is still meshed with the countershaft gear.

In the event high speed drive is desired following the operativeness of the second speed drive, [all that need be done] to obtain this higher speed drive *it is only necessary* to fully depress the control pedal 6 and then release it. It will not be necessary to move the gear-shifting lever from its set position indicated by "DR." When the pedal 6 is fully depressed the link 115 will move forwardly and the pin 116 carried thereby will engage the surface 94 on the V-shaped cam and be guided into the recess 99 of the double arm lever 92, thus picking up this arm and rotating it to the position shown in Figure 7. As the double arm lever 92 is rotated the selecting member 93 will be rotated with it and thus the apex 96 of the V-shaped cam will be set in the position shown in Figure 7. The positioning of the double arm lever in the position shown in Figure 7 will result in the double clutch element 44 being shifted from the position shown in Figure 4 to the position shown in Figure 8, and consequently the sleeve 20 will be directly connected to the driving shaft. Release of the pedal 6 will now result in re-engagement of the clutch and the driving of the vehicle in high speed drive, which will be a direct drive connection between the driving shaft 8 and the driven shaft 12, due to the fact that the sleeve is directly connected to both shafts. In this high speed drive the low speed gear 16 will "free-wheel" in the same manner as it does when second speed drive is operative.

During the cycle of speed change from low speed, as when a higher speed two-way drive is established, the low speed two-way drive is rendered inoperative to overrun automatically in response to the establishment of the higher speed two-way drive. Thus, the low speed two-way drive is rendered inoperative and overrunning operation is effective by automatic operation prior to positive engagement of a higher speed two-way drive. During this cycle of speed change, a one-way low speed drive could become momentarily operative, but not effective as a vehicular drive, prior to the positive engagement of either intermediate or high speed. However, it will be appreciated that the one-way clutch connection between the gear 16 and the member 49 splined to the shaft 13 is never a vehicular driving connection whereby torque is transmitted thereby from the driving shaft 8 to the driven shaft 12 of the transmission mechanism. The overrunning clutch O of the present invention functions only as a means for accommodating a relative idle overrunning action between the member 49 and the gear 16 to prevent demeshing of the gear 16 from the countershaft gear 17 while higher speeds; viz, second and high, are selectively rendered operative. This function results in the advantageous gear shifting action hereinbefore described to obtain rapid change-speed operation without incurring the disadvantageous, and often dangerous, inherent features of "free-wheeling" *as a vehicular drive.*

When high speed drive is operative and it should be desired to again obtain second speed drive, [all that need be done is] *it is only necessary to* fully depress the pedal 6 beyond clutch disengaging position and release it. This will result in the pin 116 riding into the recess 119 of the double arm lever and shifting the double clutch element 44 rearwardly to the position shown in Figure 4. As the double arm lever 92 is rotated to the position shown in Figure 2, the selecting cam will move with it due to the spring connection 102 and the apex 96 will then be set so that a subsequent depression of the clutch pedal 6 following its release will again result in [the obtaining of] *reactivating* high speed drive.

If, at any time when driving in either second or high speed drives, it is desired to return to low drive, it will only be necessary to depress the pedal 6 and then move the gear-shifting lever to the "LO" position. This will result in the sleeve 20 being disconnected from the driven shaft by a rearward movement of the sliding unit U and the gear 16 positively connected to the driven shaft by the clutch element 58 as indicated in Figure 14.

If it should be desired to neutralize the transmission when either low, second, or high speed drive is operative, then this can be accomplished very readily by disengaging the engine clutch 5 and moving the hand lever 84 to the "N" position. This will move the sliding unit rearwardly to its medial position wherein the gear 16 is out of mesh with the gear 17 and also out of mesh with the reverse idler gear 18. As the sliding unit moves rearwardly it will move the clutch element 58 with it in engaged relation as shown in Figures 13 and 14.

To obtain reverse speed drive it is only necessary to disengage the engine clutch and set the gear-shifting lever to the "R" position which will move the sliding unit U, together with the clutch element 58, to the position shown in Figure 15 wherein the gear 16 will engage the idler gear 18 and thus establish reverse speed drive which may now be employed in reversing the vehicle when the engine clutch 5 is again engaged. Since the teeth of clutch element 58 remain engaged with the internal teeth 60 of the gear 16 when reverse speed drive is established, this drive will also have a two-way positive drive. Neutral condition of the transmission is again obtained from reverse speed drive by depressing the pedal 6 and moving the gear-shifting lever to the "N" position. This will move the sliding unit U forwardly so that the gear 16 is out of mesh with the reverse idler gear, but not in mesh with the countershaft gear 17. As the unit U is moved forwardly the clutch element 58 will be carried with it, due to it being yieldably locked to the gear 16 by the functioning of the spring pressed balls 63 which are engaged with the internal teeth recesses 68. This engaged condition of the clutch element 58 and the gear 16 will prevail until the shoulders 57 of the splines 15 are engaged by the clutch element and the unit U is moved forwardly therefrom.

From the foregoing description of my improved variable-speed transmission together with the control means, it is believed to be apparent that the various speed drives can be obtained quickly and with a minimum number of personal operations. If the vehicle is to be started in low speed drive, the gear-shifting lever need only be moved to two different positions from its neutral position to obtain all three forward speed ratios and both of these positions are obtained by a movement of a lever preferably in a single plane as illustrated for example, however, this lever may be operated in different planes for controlling the transmission in a similar manner as is well known in conventional practice. If the motor vehicle is to be started in second speed drive, then the hand lever 84 need only be set in one position; namely the "DR" position and it can remain there as long as only second and high speed drives are desired, these drives being obtained merely by depressing and releasing the pedal 6, as by way of example, or by other equivalent actuating means hereinbefore referred to. The double sliding clutch element for obtaining the two higher speed drives has associated therewith synchronizing means and, therefore, the shifting operations to obtain these two speed drives is accomplished in a silent and efficient manner. Also, with the improved transmission it is possible to leave the combined low and reverse speed drive gear in mesh with the low speed countershaft 17 gear during all conditions of forward driving, regardless of which forward speed drive is desired. Such gear meshed selective drive changing produces smoother gear control with less wear on the gears by reducing the number of meshing and unmeshing operations conventionally required for proper control of transmissions having three forward and a reverse speed drive. This is accomplished by my novel sliding unit which provides for the low speed sliding gear to be overrun when the two higher speed drives are made operative. This over-running arrangement for the low speed gear, however, will not be effective when low speed drive is established as the one-way clutch is positively locked out and the gear 16 connected to the driven shaft by means of the two-way clutch 58. This two-way clutch also is effective whenever the transmission is conditioned for reverse speed drive. The arrangement of the positive clutch 58 for the combined low and reverse gear accommodates easy and positive engagement whenever this engagement is desired as a result of moving the sliding unit U from the position shown in Figure 5 to the position shown in Figure 14. This easy engagement is further facilitated by the chamfering of the inter-engaging teeth 59 and 60. It is also to be noted as a special feature of the transmission and its control means that whenever the higher speed drives are desired, the lowest of said higher speed drives, namely, second speed drive, will always be made operative first. This is insured by a full depression of the clutch pedal 6 or operation of equivalent actuating means before the gear-shifting lever 84 is placed in its "DR" position.

In the transmission and control [therefore] *therefor*, shown by way of example, I have disclosed particular structure wherein my improved sliding unit U and lock-up means is embodied, but it is to be understood that it may be used with other gear arrangements where it is desired to maintain a sliding gear meshed with another gear or gears and yet obtain both a one-way and two-way drive through the sliding gear. It is also to be understood, as hereinbefore stated, that other actuating means can be employed than those shown for controlling the double clutch element 44 and the low-reverse sliding unit U in the particular transmission shown and described. It is also possible and practical to incorporate the illustrated lock-up means 58 on the opposite side of the sliding unit gear if such is found desirable. It will, therefore, be understood that modifications and variations may be effected without departing from the scope of the novel concepts of the present invention.

I claim as my invention:

1. In a variable-speed transmission, a driven shaft, a gear surrounding the shaft and slidably supported thereby and adapted to be driven by a meshed condition with another gear, an over-running clutch *operably* interposed between the gear and the driven shaft, two-way drive connecting means between the gear and the driven shaft, and means for driving the driven shaft at a speed differing from that at which the driven shaft can be driven through the slidable gear, said two-way drive connecting means and said last-named means being controlled by sliding movement of the gear and being selectively operable at two positions of the gear, the gear at each position having a meshed condition with another gear and being driven thereby.

2. In a variable-speed transmission, a driven shaft, a member slidably and non-rotatably mounted thereon, a gear carried by the member, a one-way clutch *operably incorporated* between the gear and member, means for driving the gear, means operable while the gear is being driven and the member is moved to one position for connecting the gear to the driven shaft for two-way positive drive, and means operable while the gear is being driven and the member is moved to another position for driving the driven shaft at a higher speed than the shaft can be driven by the gear, said two-way positive drive connection being inoperative in the said other position.

3. In a variable-speed transmission, a driving shaft, a driven shaft, an element driven by the driving shaft, a gear driven by the driving shaft, a member slidably and non-rotatably mounted on the driven shaft, a gear mounted on the member for sliding movement therewith and for meshing engagement with the first-named gear, a one-way clutch *operably incorporated* between the member and gear, and means for connecting and disconnecting the member to the element driven by the driving shaft by a sliding movement of the member and while the gear thereon remains meshed with the first-named gear.

4. In a variable-speed transmission, a driving shaft, a driven shaft, an element driven by the driving shaft, means for driving said element at different speeds including a shiftable member, means for controlling the shiftable member, conditioning means for the control means which when operative will [permit] *enable* the control means to cause the two speed ratios to be selectively operable, a gear driven by the driving shaft, a member slidably and non-rotatably mounted on the driven shaft, a gear mounted on the member for sliding movement therewith and for meshing engagement with a first-named gear, a one-way clutch *operably incorporated* between the member and gear, means for connecting and disconnecting the member [to the] *and* element driven by the driving shaft by a sliding movement of the member and while the gear thereon remains meshed with the first-named gear, and means for causing the conditioning means to be operative only when the element driven by the driving shaft is connected to the driven shaft.

5. In a variable-speed transmission, a driving shaft, a driven shaft, a gear driven by the driving shaft, a gear mounted on the driven shaft and capable of meshing with the first gear, two-way connecting means separate from the gears for driving the driven shaft from the driving shaft at a greater speed than the driven shaft can be driven by the meshed gears, a one-way clutch means *operably incorporated* between the gear mounted on the driven shaft and said driven shaft, means providing two-way connection between said driven shaft gear and the driven shaft, and slidable means movable without unmeshing the gears for selectively causing both two-way connections to be operative.

6. In a variable-speed drive transmission, a driving shaft, a driven shaft, a gear driven by the driving shaft, a gear mounted on the driven shaft and capable of meshing with the first-named gear, a sleeve on the driven shaft, means for driving the sleeve at a different drive ratio from the driving shaft, control means therefor, two-way connecting means separate from the gears for connecting and disconnecting the sleeve to and from the driving shaft, a one-way clutch means operably incorporated between the gear mounted on the driven shaft and said driven shaft, means providing two-way connection between said driven shaft gear and the driven shaft, slidable means movable without unmeshing the gears for selectively causing both two-way connections to be operative, and means operable when the first-named two-way connecting means is established for conditioning the control means to be operative to selectively establish the said two different drive ratios at which the sleeve can be driven.

7. In a variable-speed transmission, a driving shaft, a driven shaft, a gear driven by the driving shaft, a member slidably and non-rotatably mounted on the driven shaft, a gear mounted on the member for sliding movement therewith and arranged to mesh with the first-named gear, a one-way clutch operably incorporated between the member and second-named gear, a toothed clutch element carried by the driven shaft, and toothed clutch means carried by the gear mounted on the member and arranged to engage the toothed clutch element, said toothed clutch element being so associated with the driven shaft and the slidable member that it can be engaged with and disengaged from the gear clutch teeth when the member is moved to two different positions at both of which the gears are in meshed condition.

8. In a variable-speed transmission, a driving shaft, a driven shaft, a gear driven by the driving shaft, a member slidably and non-rotatably mounted on the driven shaft, a gear mounted on the member for sliding movement therewith and arranged to mesh with the first-named gear, a one-way clutch operably incorporated between the member and second-named gear, a toothed clutch element carried by the driven shaft, toothed clutch means carried by the gear mounted on the member and arranged to engage the toothed clutch element, said toothed clutch element being so associated with the driven shaft and the slidable member that it can be engaged with and disengaged from the gear clutch teeth when the member is moved to two different positions at both of which the gears are in mesh, a second gear driven by the driving shaft for meshing engagement with the sliding gear by a movement of the sliding member to a position [where] *wherein* the sliding gear is out of mesh with the first-named gear, and means for maintaining the toothed clutch element in engagement with the toothed clutch means on the sliding gear when said second-named gear is moved to mesh with the said second gear driven by the driving shaft.

9. In a variable-speed transmission, a driving shaft, a driven shaft, an element driven by the driving shaft, means for driving said element at different speeds including a shiftable member, means for shifting the member including selecting means, a gear driven by the driving shaft, a member slidably and non-rotatably mounted on the driven shaft, a gear mounted on the member for sliding movement therewith and for meshing engagement with the first-named gear, a one-way clutch operably incorporated between the sliding member and second-named gear, means for connecting and disconnecting the sliding member and the element driven by the driving shaft by a sliding movement of the member and while the gear thereon remains meshed with the first-named gear, and means for conditioning the selecting means for operation only when the element driven by the driving shaft is connected to the driven shaft.

10. In a variable-speed transmission, a driving shaft, a driven shaft, a countershaft driven from the driving shaft, a gear on the countershaft, a member slidably and non-rotatably mounted on the driven shaft, a gear mounted on the member and slidable therewith to meshed and unmeshed positions with the gear of the countershaft, a one-way clutch operably incorporated between the aforesaid slidable gear and member, an element driven from the driving shaft, means for two-way clutching the element to the member, and means for two-way clutching the gear mounted on the member to the driven shaft, said last-named two-way clutching means being made operable by the sliding movement of the member to two different positions while the gear thereon remains in mesh with the countershaft gear.

11. In a variable-speed transmission, a driving shaft, a driven shaft, a countershaft driven from the driving shaft, a gear on the countershaft, a member slidably and non-rotatably mounted on the driven shaft, a gear mounted on the member and slidable therewith to meshed and unmeshed positions with the gear of the countershaft, a one-way clutch operably incorporated between the aforesaid slidable gear and member, an element, means for selectively driving said element from the driving shaft at different speeds, means for controlling said selecting means, means for two-way clutching the element to the member, means for two-way clutching the gear mounted on the member to the driven shaft, said last-named two-way clutch means being made operable by the sliding movement of the member to two different positions while the gear thereon is in mesh with the countershaft gear, and means for conditioning the controlling means for the selecting means for operation when the first-named two-way clutching means is made operative.

12. In a variable-speed transmission, a driving shaft, a driven shaft, a countershaft driven from the driving shaft, a gear on the countershaft, a reverse idler gear driven by the countershaft, a member slidably and non-rotatably mounted on the driven shaft, a gear mounted on the member and slidable therewith to meshed and unmeshed positions with the gear of the countershaft and with the reverse idler gear, a one-way clutch operably incorporated between the aforesaid slidable gear and member, an element driven from the driving shaft, means for two-way clutching the element to the member, means for two-way clutching the gear mounted on the member to the driven shaft, said last-named two-way clutching means being made operable by the sliding movement of the member to two different positions while the gear thereon remains [in mesh] *enmeshed* with the countershaft gear, and means for maintaining said last-named two-way clutching means operative when the member is moved to unmesh the gear mounted thereon from the countershaft gear and mesh it with the idler gear.

13. In a variable-speed transmission: a driving shaft; a driven shaft; a sleeve rotatably mounted on the driven shaft; means for selectively driving the sleeve at different speeds from the driving shaft; a member slidably and non-rotatably mounted on the driven shaft; a gear mounted on the member for movement therewith; a one-way clutch operably incorporated between the member and the gear; a gear driven by the driving shaft and arranged for meshing engagement by the gear mounted on the member; and means operable while the gear on the member is meshed with the last-named gear and said member is in one position for establishing a two-way connection with the driven shaft, and while said member is in another position with the gears remaining meshed for establishing a two-way connection between the member and the sleeve.

14. In a variable-speed transmission: a driving shaft; a driven shaft; a sleeve rotatably mounted on the driven shaft; means for selectively driving the sleeve at different speeds from the driving shaft; a member slidably and non-rotatably mounted on the driven shaft; a gear mounted on the member for movement therewith; a one-way clutch operably incorporated between the member and the gear; a gear driven by the driving shaft and arranged for meshing engagement by the gear mounted on the member; means operable while the gear on the member is meshed with the last-named gear and said member is in one position for establishing a two-way connection with the driven shaft, and while said member is in another position with the gears remaining meshed for establishing a two-way connection between the member and the sleeve; and means operable when the member is in the last-named position for conditioning for operation the means for selectively driving the said sleeve at different speeds.

15. In a variable-speed transmission: a driving shaft; a driven shaft; a sleeve rotatably mounted on the driven shaft; means for selectively driving the sleeve at different speed ratios from the driving shaft; means for controlling said *driving* means; a member slidably and non-rotatably mounted on the driven shaft; a gear mounted on the member for movement therewith; a one-way clutch operably incorporated between the member and the gear; a gear driven by the driving shaft and arranged for meshing engagement by the gear mounted on the member; means operable while the gear on the member is meshed with the last-named gear and said member is in one position for establishing a two-way connection with the driven shaft, and while said member is in another position with the gears remaining in mesh for establishing a two-way connection between the member and the sleeve; and means for preventing the controlling means from being effective to cause the sleeve to be driven at different speed ratios from the driving shaft except when the member is in a position to establish a two-way connection between the slidable member and the sleeve.

16. In a variable-speed transmission, a [drive] *driving* shaft, a driven shaft, a gear driven by the [drive] *driving* shaft, a reverse idler gear driven by the [drive] *driving* shaft, a member slidably and non-rotatably mounted on the driven shaft, a gear mounted on the member for sliding movement therewith and selectively capable of being meshed with the first-named gear and the idler gear by sliding movement of the member, a one-way clutch operably incorporated between the member and the third-named gear mounted thereon, a clutch element having clutch teeth and slidably and non-rotatably mounted on the driven shaft, clutch teeth carried by the third-named gear, means for engaging and disengaging the clutch teeth of the [first-named] *third-named* gear and the clutch element when the member is moved between two positions at both of which the [first-named] *predetermined third-named* gear is meshed with the first-named gear driven by the driving shaft, and means for causing said teeth of the third-named gear and the clutch element to remain in engagement [and] *so that* the element [to] *can* move as a unit with said third-named gear and member when simultaneously moved to and from a *third predetermined* position wherein said third-named gear is meshed with the idler gear, *and means for slidably moving said member.*

17. In a variable-speed transmission, a [drive] *driving* shaft, a driven shaft, a gear driven by the [drive] *driving* shaft, a reverse idler gear driven by the [drive] *driving* shaft, a member slidably and non-rotatably mounted on the driven shaft, a gear mounted on the member for sliding movement therewith and selectively capable of being meshed with the first-named gear and the idler gear by sliding movement of the member, *means for sliding said member*, a one-way clutch operably incorporated between the member and the third-named gear mounted thereon, a clutch element having clutch teeth and slidably and non-rotatably mounted on the driven shaft, clutch teeth carried by the third-named gear, means for engaging and disengaging the clutch teeth of the third-named gear and the clutch element when the member is moved between two *predetermined* positions at both of which the [first-named] *third-named* gear is meshed with the first-named gear driven by the driving shaft, and means for causing said teeth of the [first-named] *third-named* gear and the clutch element to remain in engagement [and] *so that* the element [to] *can* move as a unit with said third-named gear and member when simultaneously moved to and from a position wherein said third-named gear is meshed with the idler gear, said last-named means comprising yieldable detent means carried by the element and operably cooperating with said third-named gear.

18. In a variable-speed positive drive transmission, a [drive] *driving* shaft, a driven shaft, [an] *a connectible* element driven by the driving shaft, means for driving said element at two different speeds including a shiftable member, actuating means for shifting said member, conditioning means for selectively controlling the actuating means to establish the two speeds when actuated, a gear driven by the [drive] *driving* shaft, a reverse idler gear driven by the [drive] *driving* shaft, a member slidably and non-rotatably mounted on the driven shaft, a gear mounted on the member for sliding movement therewith and selectively capable of being meshed with the first-named gear and the idler gear by sliding movement of the member, *means for sliding said member*, a one-way clutch operably incorporated between the member and the third-named gear mounted thereon, a clutch element having clutch teeth and slidably and non-rotatably mounted on the driven shaft, clutch teeth carried by the third-named gear, means for engaging and disengaging the clutch teeth of the third-named gear and the clutch element when the member is moved between two *predetermined* positions at both of which the third-named gear on said member is meshed with the first-named gear driven by the driving shaft, means *effective* for connecting the *first-named* element [which is capable of being driven at two speeds with the driven shaft when the sliding member is in the position disengaging] *when the slidable member is in the aforementioned disengaged position with respect to* the aforesaid clutch teeth, means for causing said teeth of said third-named gear and the clutch element to remain in engagement [and] *so that* the *clutch* element [to] *can* move as a unit with said third-named gear and member when simultaneously moved to and from a third *predetermined* position wherein said third-named gear is meshed with the reverse idler gear, and means for causing the conditioning means to be operative to selectively control said actuating means as aforesaid when the slidable member is connected to the *first-named* element [capable of being driven at two different speeds].

19. In a variable-speed drive transmission, a driven shaft, a gear surrounding the shaft and slidably supported thereby and adapted to be driven by a meshed condition with another gear, means for driving the driven shaft in one direction only by means of the gears when in meshed condition and including a one-way clutch, means for driving the driven shaft at a different drive ratio than the drive ratio it can be driven by the meshed gears and one-way clutch, and means for controlling the establishment of the said different drive ratio by a sliding movement of the slidable gear while maintaining its meshed condition with said other gear.

20. In a variable-speed drive transmission, a driven shaft, a gear surrounding the shaft and slidably supported thereby and adapted to be driven by a meshed condition with another gear, means for driving the driven shaft in one direction only by means of the gears when in meshed condition and including a one-way clutch, means for driving the driven shaft at a different drive ratio than the drive ratio it can be driven by the meshed gears and one-way clutch, means for establishing a two-way drive connection between the slidable gear and the driven shaft, and means for controlling the establishment of the said different drive ratio and the two-way drive connection selectively by a sliding movement of the slidable gear to two positions in each of which the slidable gear has a meshed condition with the said other gear.

21. In a variable-speed transmission, a driving shaft, a driven shaft, a gear surrounding the driven shaft and slidably supported thereby, a countershaft driven by the driving shaft, a gear mounted to rotate with the countershaft driven by the driving shaft and with which the slidable gear is meshable, means for driving the driven shaft in one direction only by means of the gears when in meshed condition including a one-way clutch, a sleeve on the driven shaft, means for driving the sleeve at different speeds from the driving shaft, and positive clutch means for connecting the sleeve to the driven shaft controllable by a sliding movement of the sliding gear on the driven shaft, said positive clutch means being selectively operative during meshed condition of the sliding gear with the countershaft gear.

22. In a gear transmission, parallel shafts, a gear mounted on one shaft for rotation, a gear surrounding the other shaft and slidably supported thereby, means operable for sliding said slidable gear to two different axial positions on the said other shaft in each of which it is in meshed relation with the first-named gear, means for operably establishing an overrunning relative movement between the slidable gear and the shaft upon which it is supported when said slidable gear is in one position, means for establishing a two-way drive connection between the slidable gear and the shaft upon which it is supported when the said slidable gear is in its other position, and additional gears on said parallel shafts for establishing driving relation therebetween, with the overrunning relative movement between the slidable gear and the shaft upon which it is supported accommodating such driving relation by virtue of said additional gears without demeshing said slidable gear and said first-named gear.

23. In a gear transmission, parallel shafts, a gear mounted on one shaft for rotation, a gear surrounding the other shaft and slidably supported thereby, means for operably sliding said slidable gear to three different axial positions on the said other shaft in two of which positions it is in meshed relation with the first-named gear and the other positions of which it is demeshed from said first-named gear, means for operably establishing an overrunning relative movement between the slidable gear and the shaft upon which it is supported when said slidable gear is in one of the two aforesaid meshed positions, and means for converting said overrunning movement into a two-way drive connection between the slidable gear and the shaft upon which it is supported when the said slidable gear is operated by said sliding means to its other meshed or the demeshed position.

24. In a variable-speed transmission, a shaft, a member slidably and non-rotatably mounted on the shaft, a gear on the member, a one-way clutch connection *operably incorporated* between the gear and member, a parallel shaft, a gear mounted on said parallel shaft and capable of being in meshed relation with the first-named gear when the latter and the member are moved as a unit, and means operable by sliding movement of the member and the gear thereon to two different positions, in both of which the gears remain in mesh, for establishing in one position a two-way drive from the gear on the first-named shaft to said shaft and for establishing in the other position a two-way drive to the slidable member independently of the gears.

25. In gearing, a splined shaft, a member slidable on the splines and rotatable with the shaft, a gear mounted on the member for movement therewith and being provided with clutch teeth, a one-way clutch operably incorporated between the gear and member, a second member slidable on the splines of the shaft and having clutch teeth for cooperation with the gear clutch teeth, and detent means associated with the second-named member and the shaft preventing said member from sliding movement on the shaft during movement of the gear to bring the clutch teeth into inter-engaging relation while accommodating movement of the second-named member with the gear as a unit after said inter-engaging relation is established.

26. In gearing: a splined shaft; a member slidable on the splines and rotatable with the shaft; a gear mounted on the member for movement therewith and being provided with clutch teeth; a one-way clutch operably incorporated between the aforesaid gear and member; a second member slidable on the splines of the shaft and having clutch teeth for cooperation with the gear clutch teeth; shoulder means on the shaft to limit the movement of said second member in one direction only; detent means operably incorporated between the second-named member and the shaft for preventing said member from sliding movement on the shaft in a direction away from the shoulder means during movement of the gear to bring the clutch teeth into inter-engaging relation, and for releasing the second-named member for movement with the gear as a unit after said inter-engaging relation is established; and yieldable means for releasably maintaining the clutch teeth in inter-engaging relation during movement of the second-named member and the gear in either direction from or toward the shoulder means.

27. In gearing: a splined shaft; a member slidable on the splines and rotatable with the shaft; a gear mounted on the member for movement therewith and being provided with clutch teeth; a one-way clutch operably incorporated between the aforesaid gear and member; a second member slidable on the splines of the shaft and having clutch teeth for meshable cooperation with the gear clutch teeth; shoulder means on the shaft to limit the movement of said second member in one direction only; detent means operably incorporated between the second-named member and the shaft for preventing said member from sliding movement on the shaft in a direction away from the shoulder means during movement of the gear to bring the clutch teeth into inter-engaging relation, and for releasing the second-named member for movement with the gear as a unit after said inter-engaging relation is established, said detent means being effective to maintain the clutch teeth in the aforesaid inter-engaging relation during movement of the second-named member and the gear in either direction from or toward the said shoulder means.

28. In an automotive variable-speed positive drive gear transmission, a driving shaft, a driven shaft, a sleeve rotatably mounted on the driven shaft, means for selectively driving the sleeve at two different forward speeds from said driving shaft, a member having a gear mounted thereon drivingly connected thereto by one-way clutch means operably incorporated therebetween, said member being slidably and non-rotatably mounted on said driven shaft, means for selectively driving said gear at a third different forward speed from the driving shaft, a clutch element slidably and non-rotatably mounted on said driven shaft for operably locking-out said one-way clutch means, means for selectively connecting said sleeve to said driven shaft, and the gear mounted on the member to said clutch element by slidably operating said member to two positions in either of which the gear mounted on the member remains meshed with the aforesaid driving means therefor, actuating means for causing said first-named speeds to be selectively established, and means operable independently of said last-named means for selectively sliding said gear member to the two positions aforesaid to cause the third speed to be established and to condition said last-named means for selective operation.

29. In a variable-speed power transmission: a shaft; a gear slidably mounted thereon; a parallel shaft; a gear mounted on said parallel shaft for rotation, said gears being arranged for meshed relation; means operable by sliding movement of the first-named gear for establishing a two-way drive connection between said shafts through the meshing of said gears; means including additional meshable gears on said shafts for driving the first-named shaft at a different speed to that effective when torque is transmitted through said first-named gear and said second-named gear; means for accommodating said last-named drive by sliding movement of said first-named gear without unmeshing said first-named gear and said second-named gear, said means including an overrunning clutch; and means operable for sliding said first-named gear while retaining the same in meshed relation with said second-named gear.

*30. In change-speed gear two-way drive power transmissions; a driving shaft; a driven shaft; a plurality of gear sets for connecting said shafts in variant relative forward driving speed relation and including an element selectively shiftable from a neutral position into first and second positions of uninterrupted meshing engagement with one of said gear sets for establishing in part a first speed forward drive, and for conditioning the transmission for forward drive in at least two different higher speed drives, respectively; personally-controlled means for shifting said element; one-way coupling means operably incorporated in said one gear set including a positive coupling normally connected in parallel relation to said element in first meshing position for completing the first speed drive, and operatively disconnectible from said element in second meshing position for rendering said one-way coupling means operative to overrun to disable the first speed drive; means operable for releasably maintaining said element and positive coupling connected in first meshing position, and for accommodating operative disconnection thereof in second meshing position; means effective in response to shifting said element to its second meshing position for causing said last-named means to disconnect the positive coupling from said element to enable said one-way coupling means to operatively overrun and disable the first speed drive; a clutch member common to said higher speed drives and cooperatable with a clutch member carried by said element to condition said higher speed drives for selective establishment by connecting the same to the driven shaft when said element is shifted into its second meshing position; and actuating means including a movable member operable for selectively connecting the gear sets of the higher speed drives to establish said drives with the said element shifted into second meshing position.*

*31. In power transmissions according to claim 30 in which shifting of said element to neutral (demeshed) position with respect to the said one gear set, neutralizes all three forward speed drives to render forward driving through said transmission ineffective.*

*32. In power transmissions according to claim 30 in which said one-way coupling means comprise a series of graduated circumferentially spaced rollers operatively interposed between the shiftable element and driven shaft, and in which the positive coupling is slidably splined on the driven shaft and includes a toothed element movable into and out of interengaging relation with a cooperating toothed element carried by the shiftable element.*

*33. In power transmissions according to claim 30 in which the positive coupling is operated into connecting and disconnecting relationship with said shiftable element to render said one-way coupling means inoperative and operative, in response to shifting said element from first to second meshing position, respectively.*

*34. In power transmissions according to claim 30 in which said third-named means comprise two elements biased in opposite directions by a spring interposed therebetween, said elements having operative engagement with confronting depressions carried respectively by said shiftable element and the driven shaft whereby said positive coupling is releasably maintained connected with said shiftable element.*

*35. In power transmissions according to claim 30 in which said fourth-named means comprises a shoulder defined by mergence of two different diameters of said driven shaft, said positive coupling operatively engaging said shoulder when said shiftable element is shifted to its second meshing position as aforesaid, to thus render said one-way coupling means operative to overrun.*

*36. An automotive torque changing positive drive mechanism including: a driving shaft; a driven shaft; a countershaft; and selectively engageable elements providing a plurality of forward drive torque transmitting connections between said driving and driven shafts, and through said countershaft at different ratios, said torque transmitting connections including: a clutch member slidably splined on the driven shaft for rotation therewith; a gear slidable with the clutch member; a one-way coupling operably incorporated between the slidable gear and clutch member to accommodate relative rotation therebetween; a gear fast on the countershaft and adapted to accommodate two positions of uninterrupted meshing relation with said slidable gear; a positive coupling operably associated with said slidable gear and slidably splined on the driven shaft for rotation therewith; a releasable connection between said slidable gear and positive coupling operable to enable said coupling to slide in connected relation with the slidable gear to one of its meshing positions to establish a certain drive connection wherein said one-way coupling is inoperative, and to accommodate independent sliding movement of said slidable gear with respect to said positive coupling to disconnect the same when said slidable gear is moved to its other meshing position wherein said one-way coupling is operative to overrun and disable the first drive connection; an independent clutch member common to the other drive connections and adapted to clutch the first-named clutch member when said slidable gear is in its other meshing position to condition said other drive connections for selective establishment; actuating means including a movable selector member for establishing said other drive connections; and personally-controlled means for sliding said slidable gear.*

*37. The torque changing drive mechanism according to claim 36 including a housing therefor and a reverse drive connection comprising another gear fast on the countershaft in constant mesh with an idler gear carried by the housing, and said slidable gear meshing with said idler gear.*

*38. The torque changing drive mechanism according to claim 37 in which the positioning of the slidable gear in demeshed relation with respect to the aforesaid first-named countershaft gear and the idler gear, renders the said drive connections ineffective to transmit torque.*

GLENN T. RANDOL.

References Cited in the file of this patent
the original patent

UNITED STATES PATENTS

| Number | Name | Date |
|---|---|---|
| 1,886,003 | Garrison | Nov. 1, 1932 |
| 1,901,283 | Burtnett | Mar. 14, 1933 |
| 1,902,618 | Burtnett | Mar. 21, 1933 |
| 1,930,072 | Barton | Oct. 10, 1933 |
| 1,931,755 | Drexler | Oct. 24, 1933 |
| 1,950,110 | Hartsock | Mar. 6, 1934 |
| 1,950,844 | Forster | Mar. 13, 1934 |
| 1,958,607 | Burtnett | May 15, 1934 |
| 1,966,296 | Isham | July 10, 1934 |
| 2,261,898 | Barkeij | Nov. 4, 1941 |